A. JAGIELO.
WIRE CUTTING SCISSORS.
APPLICATION FILED MAR. 4, 1918.
1,284,351.
Patented Nov. 12, 1918.
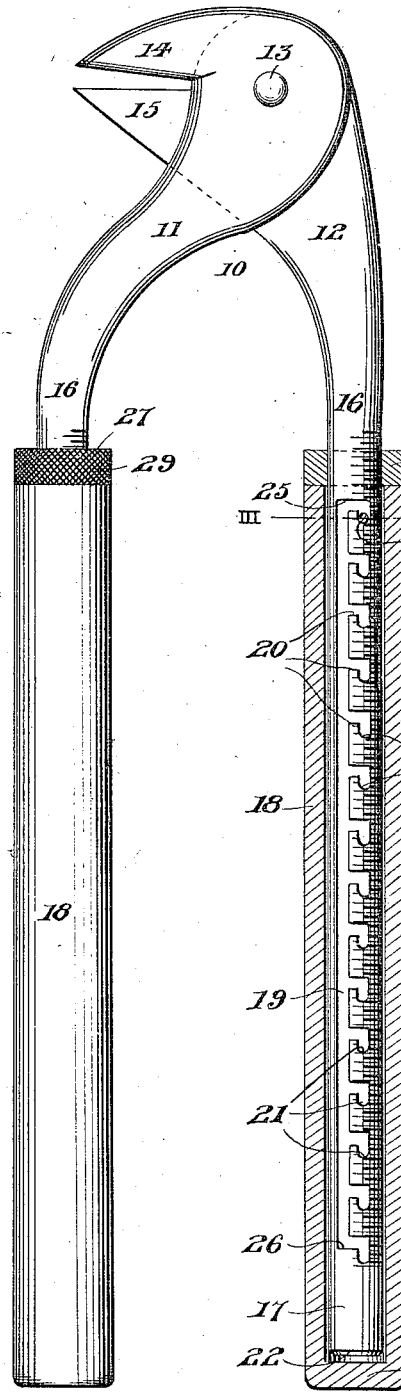
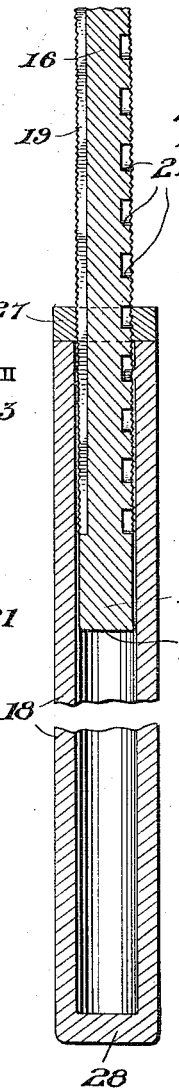
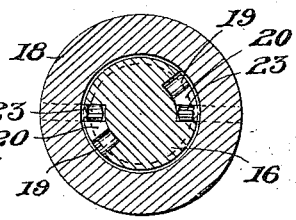
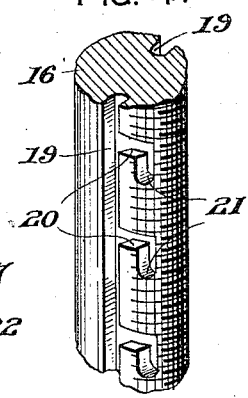
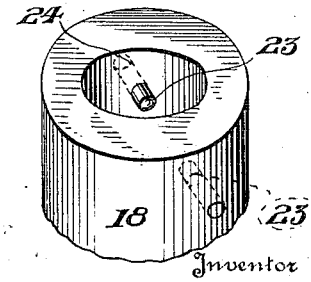
Inventor
A. Jagielo

UNITED STATES PATENT OFFICE.

ANTONI JAGIELO, OF CLEVELAND, OHIO.

WIRE-CUTTING SCISSORS.

1,284,351.    Specification of Letters Patent.   Patented Nov. 12, 1918.

Application filed March 4, 1918. Serial No. 220,307.

*To all whom it may concern:*

Be it known that I, ANTONI JAGIELO, a subject of the Emperor of Austria, residing at Cleveland, in the county of Cuyahoga and State of Ohio, have invented certain new and useful Improvements in Wire-Cutting Scissors, of which the following is a specification.

The primary object of the invention is the provision of a device for cutting wire adapted for ready adjustment for rendering the operation easier when cutting large wires when the device is grasped by the person in charge of the cutting of the wire.

A further object of the invention is to provide an adjustable holding means for wire cutters whereby the amount of purchase or leverage for operating the device may be readily regulated at will, the structure possessing great strength and durability.

A still further object of the invention is to provide a handle for wire-cutting scissors that is simple in construction and easy to manufacture and which may be readily adjusted for changing the length of the operating handle of the scissors for permitting the application of different degrees of force upon the cutting jaws thereof when operating upon work of different size or hardness.

In the drawing forming a part of this application and in which like numerals refer to corresponding parts throughout the several views:

Figure 1 is a side elevation of the device with a portion of one of the handles shown in central longitudinal section;

Fig. 2 is a central longitudinal sectional view of a portion of one of the handles partially broken away illustrated partially extended;

Fig. 3 is an enlarged transverse sectional view of one of the handles taken upon line 3—3 of Fig. 1;

Fig. 4 is a perspective view of a portion of one of the handle shanks; and

Fig. 5 is a perspective view of an end portion of one of the extension members employed with the device.

Referring more in detail to the drawing, it will be understood that the device is applicable to different forms of cutting scissors or shears being herein illustrated as applied to a pair of scissors 10 having jaws 11 and 12 pivoted together as at 13 and provided with coöperating cutting blades 14 and 15 respectively laterally projecting from the said shanks.

The operating handles for the jaws 11 and 12 comprise threaded cylindrical shanks 16 and 17 respectively projecting from the said jaws with tubular hand-grips 18 adjustably mounted upon the said shanks. Opposite longitudinal slots 19 are provided for each shank with equally spaced apart L-shaped recesses 20 laterally projecting from the said slots having their free end portions 21 in the form of sockets extending toward the free end 22 of the shank.

Oppositely arranged inwardly projecting studs 23 are carried by the inner face 24 of the hand grips 18 slidably positioned within the slots 19, it being seen that when the studs 23 are arranged within the said slots that the hand grip 18 may be freely moved longitudinally upon its carrying shank, 16 or 17, to the limit of movement of the hand grip upon the shank until the studs 23 engage the walls 25 or 26 at the inner and outer ends respectively of the said slots 19. When the studs 23 are positioned in alinement with any of the recesses 20 a slight rotation of the hand grip 18 upon the shank 16 or 17 will move the studs 23 through the recesses 20 and permit the said studs to seat within the sockets 21 at the opposite sides of the shank. A lock-nut 27 is arranged upon each of the shanks adapted for engaging the inner end of the adjacent hand grip 18 for locking the grip in its adjusted position upon the carrying shank with the studs 23 seated within the desired pair of oppositely positioned sockets 21. It will be understood that the outer ends 28 of the grips 18 are closed, and with the nuts 27 prevent dirt and moisture from accumulating within the said grips. The nuts 27 are preferably cylindrical having roughened or milled surfaces 29 for facilitating operation. The recesses 20 it will be noted extend in opposite directions at the opposite sides of the shanks to permit the opposite studs 23 to simultaneously move through the recesses 20 and into the sockets 21 at the opposite sides of the shank.

From this detailed description of the invention it will be seen that the grips 18 may be locked upon the shanks 16 and 17 with the studs 23 within sockets 21 as shown in Fig. 1 of the drawing, while by releasing the nuts 27, the grips 18 may be projected and held at the desired adjustment with the studs 23 positioned within the desired sockets 21, such as the position illustrated in Fig. 2, it being understood that the nuts 27 retain the grips in their adjusted positions. In this manner, the handles for operating the jaws 11 and 12 are rendered adjustable in length for changing the amount of leverage upon the jaws 11 and 12, it being understood that when the larger or harder wire is to be cut by the blades 14 and 15, the operation may be more easily accomplished by securing the grips 18 in projected positions upon the shanks 16 and 17. The adjustment in length of the operating handles is easily and quickly accomplished and when the nuts 27 are tightened, the handles present firm and strong gripping members for the device.

What I claim as new is:—

An article of manufacture consisting of a handle member comprising a cylindrical shank having opposite longitudinal slots with recesses laterally projecting from the slots in opposite directions at the opposite sides of the shank and terminating in angularly positioned-receiving sockets, a tubular extension hand grip upon said shank, inwardly projecting studs carried by the hand grip adapted for movement within said slots for adjustment through said recesses into said sockets, and means adapted for maintaining the said studs within the sockets when the hand grip is in its adjusted position upon the shank.

In testimony whereof I affix my signature.

ANTONI JAGIELO.